(12) United States Patent
Oda et al.

(10) Patent No.: US 7,245,322 B2
(45) Date of Patent: Jul. 17, 2007

(54) IMAGING APPARATUS

(75) Inventors: Kazuya Oda, Asaka (JP); Hirokazu Kobayashi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 742 days.

(21) Appl. No.: 10/757,531

(22) Filed: Jan. 15, 2004

(65) Prior Publication Data

US 2004/0145665 A1 Jul. 29, 2004

(30) Foreign Application Priority Data

Jan. 17, 2003 (JP) .............................. 2003-009693

(51) Int. Cl.
*H04N 9/64* (2006.01)
*H04N 5/16* (2006.01)

(52) U.S. Cl. ...................... 348/243; 348/257

(58) Field of Classification Search ............. 348/216.1, 348/222.1, 239, 241, 243–245, 275, 315
See application file for complete search history.

(56) References Cited

U.S. PATENT DOCUMENTS

| | | | | |
|---|---|---|---|---|
| 5,801,773 A | * | 9/1998 | Ikeda | 348/229.1 |
| 6,144,408 A | * | 11/2000 | MacLean | 348/241 |
| 7,064,785 B2 | * | 6/2006 | Prentice et al. | 348/243 |
| 7,102,672 B1 | * | 9/2006 | Jacobs | 348/243 |
| 2004/0051796 A1 | * | 3/2004 | Kelly et al. | 348/243 |
| 2004/0096124 A1 | * | 5/2004 | Nakamura | 382/308 |
| 2004/0145672 A1 | * | 7/2004 | Sugimoto | 348/363 |

FOREIGN PATENT DOCUMENTS

| | | |
|---|---|---|
| JP | 9-205589 A | 8/1997 |
| JP | 09205589 A * | 8/1997 |

* cited by examiner

*Primary Examiner*—Vivek Srivastava
*Assistant Examiner*—Timothy J. Henn
(74) *Attorney, Agent, or Firm*—Birch, Stewart, Kolasch & Birch, LLP

(57) ABSTRACT

The invention provides an imaging apparatus in which when a difference in sensitivity between two photosensitive elements having different sensitivities is used to achieve a wide dynamic range, a correction amount of a low sensitivity portion is determined from information of a high sensitivity portion to reduce a burden of an internal process.

A black level correction value of a dependent photosensitive pixel is calculated by multiplying a black level correction value of a main photosensitive pixel by the ratio of the cell area of the main photosensitive pixel to the cell area of the dependent photosensitive pixel. It is not necessary to perform control to capture an imaging signal from the dependent photosensitive pixel belonging to an OB portion for determining the black level correction value of the dependent photosensitive pixel. Furthermore, if control to capture the imaging signal from the dependent photosensitive pixel is not performed in the OB portion, a processing system may be stopped during such a period. If the processing system is stopped during the period, contribution can be made to reduction in process and power consumption in an overall digital camera.

6 Claims, 12 Drawing Sheets

FIG.6

|  | SENSITIVITY | SATURATION | DYNAMIC RANGE |
|---|---|---|---|
| MAIN PHOTOSENSITIVE PIXEL | 1 | 1 | 1 |
| DEPENDENT PHOTOSENSITIVE PIXEL | 1/16 | 1/4 | 4 TIMES | ly converted with the main photosensitive pixel and ## IMAGING APPARATUS

This Nonprovisional application claims priority under 35 U.S.C. § 119(a) on Patent Application No(s). 2003-009693 filed in JAPAN on Jan. 17, 2003, the entire contents of which are hereby incorporated by reference.

BACKGROUND OF THE INVENTION

1. Field of the Invention

The present invention relates to an imaging apparatus, and particularly relates to a technique for reducing a burden of an internal process for determining a correction amount of a dependent photosensitive pixel based on information obtained from a main photosensitive pixel.

2. Description of the Related Art

As a solid-state imaging element for use in an imaging apparatus such as a digital camera, a CCD solid-state imaging element, an MOS-type solid-state imaging element and the like are well known. In addition, as a photosensitive element of the solid-state imaging element, a photodiode is mainly used, and a large number of pixels are arranged in a matrix form in a light-receiving area.

In recent years, the need for higher resolutions and wider dynamic ranges has been intensified for the solid-state imaging element for achieving an improvement in image quality, and the need for higher resolutions has been met by increasing the number of pixels or downsizing one pixel to increase a density.

In addition, a method of dividing one photodiode to obtain an image having a high resolution, a method of using a difference in sensitivity between two photosensitive portions of different sizes to achieve a wider dynamic range, and the like have been proposed.

A solid-state imaging apparatus disclosed in Japanese Patent Publication No. 9-205589 is such that each light-receiving portion is divided into two light-receiving areas having different sensitivities, and a signal of higher sensitivity, of signal charges read from each light-receiving portion, is multiplied by a limiter in a pixel before a saturated region is reached, and then added to a signal of lower sensitivity to form a video output signal. Characteristics such that output is changed for incident light that is essentially in an output saturated region are obtained. In this way, an output dynamic range is expanded.

SUMMARY OF THE INVENTION

However, in the case where a difference in sensitivity between two photosensitive portions is used to achieve a wider dynamic range, an image signal is acquired from each photosensitive portion, and each image signal is subjected to signal processing and correction, followed by combining two image signals to generate one image, and a method for correcting particularly a photosensitive element of lower sensitivity and the like are not specifically considered, and therefore processing time and the like are influenced.

For the solid-state imaging apparatus disclosed in Japanese Patent Publication No. 9-205589, reduction in burden of processing of imaging signals is not described, and if imaging signals are acquired independently from two photosensitive elements, and each correction value is determined based on an imaging signal obtained from each photosensitive element, it is difficult to reduce a burden of an internal process.

The present invention has been made in view of such situations, and its object is to provide an imaging apparatus in which when a difference in sensitivity between two photosensitive elements of different sensitivities is used to achieve a wider dynamic range, a correction amount of the portion of lower sensitivity is determined from information of the portion of higher sensitivity to reduce a burden of an internal process.

For achieving the object described above, an imaging apparatus according to the first aspect of the present invention is characterized by comprising:

a solid-state imaging element having a structure in which a large number of pixel cells each comprised of a combination of a main photosensitive pixel having a relatively large area and a dependent photosensitive pixel having a relatively small area are arranged according to a predetermined arrangement form, and a signal based on a signal charge photoelectrically converted with the main photosensitive pixel and a signal based on a signal charge photoelectrically converted with the dependent photosensitive pixel can be selectively acquired;

an imaging signal acquirement controlling device which performs control to acquire an imaging signal from the solid-state imaging element;

a main black level correction value determining device which determines a black level correction value of the main photosensitive pixel based on a signal obtained from the main photosensitive pixel;

a dependent black level correction value determining device which determines a black level correction value of the dependent photosensitive pixel by calculation from the black level correction value of the main photosensitive pixel determined by the main black level correction value determining device; and a black level correcting device which performs black level correction of the imaging signal acquired from the main photosensitive pixel based on the black level correction value of the main photosensitive pixel determined by the main black level correction value determining device, and performs black level correction of the imaging signal acquired from the dependent photosensitive pixel based on the dependent photosensitive pixel determined by the dependent black level correction value determining device.

According to the present invention, a black level correction value of a dependent photosensitive pixel is determined from a signal based on a signal charge photoelectrically converted with a main photosensitive pixel, thus making it possible to determine the black level correction value of the dependent photosensitive pixel without detecting from the dependent photosensitive pixel a signal for detecting the black level correction value of the dependent photosensitive pixel.

For the main-photosensitive pixel and the dependent photosensitive pixel, one photosensitive element may be divided into two elements having different areas, or two photosensitive elements having different cell areas may be used.

For the solid-state imaging element, a CCD image sensor or MOS image sensor is often used, or a combination of CCD and MOS types is also used.

In addition, for the photosensitive element, a photodiode is mainly used, and arrangements of photosensitive elements include an arrangement in which photosensitive elements are arranged at fixed pitches in both longitudinal and transverse directions in a square matrix form, and a honeycomb arrangement in which photosensitive elements are arranged with elements shifted in position in an alternate manner in longitudinal and transverse directions.

The photosensitive element has charges accumulated therein with time even in the light-blocking state. A charge that is accumulated independently of light in this way is called a dark current. Black level correction is performed for inhibiting influences on the image by the dark current.

As a form of black level correction, signals are acquired from a plurality of photosensitive elements in the light-blocking state, an average value (integrated average value) of acquired signals is calculated and defined as a black level correction value, and the black level correction value is subtracted from a signal read from each photosensitive element in the light-receiving state to perform black level correction.

An imaging apparatus according to one aspect of the present invention is characterized in that the solid-state imaging element comprises a photosensitive pixel portion being an effective pixel area, and a light-blocking pixel portion which is provided at a predetermined position other than the effective pixel area and in which the light-receiving surface of the pixel cell is blocked from light, and the main black level correction value determining device calculates a black level correction value of a main photosensitive pixel belonging to the photosensitive pixel portion based on a signal acquired from a main photosensitive pixel belonging to the light-blocking pixel portion.

An imaging signal for generating an image is acquired from the photosensitive pixel portion, and a dark current for determining a black level correction value is detected in the black pixel portion.

Because the dark current may be different for each pixel, dark currents are detected from a plurality of pixels, and an average value or integrated value thereof is defined as a black level correction value.

In addition, an imaging apparatus according to another aspect of the present invention is characterized in that the imaging signal acquirement controlling device does not perform control to acquire an imaging signal from a dependent photosensitive pixel in the light-blocking pixel portion.

According to such an aspect, the black level correction value of the dependent photosensitive pixels is calculated from the black level correction value the a main photosensitive pixel, thus eliminating the necessity to acquire an imaging signal from the dependent photosensitive pixel belonging to the light-blocking pixel portion for determining the black level correction value of the dependent photosensitive pixel.

Furthermore, if the imaging signal is not acquired from the dependent photosensitive pixel in the light-blocking pixel portion, a process system may be stopped during such a period. If the process system is stopped during the period, a contribution can be made to reduction in process and power conservation in the overall imaging apparatus. Furthermore, the period during which the process system is stopped may be assigned to other process systems such as an interruption process.

The stopping of the process system includes the stopping of a clock of the process.

Furthermore, an imaging apparatus according to another aspect of the present invention is characterized in that the black level correction value of the dependent photosensitive pixel is calculated by multiplying the black level correction value of the main photosensitive pixel by a ratio of the cell area of the main photosensitive pixel to the cell area of the dependent photosensitive pixel.

Variations in the black level depend on variations in the dark current, and occur due to a change in temperature and a difference in exposure time. When a photograph is taken under the same conditions on every occasion, the black level correction value of the dependent photosensitive pixel may be calculated by multiplying the black level correction value of the main photosensitive pixel by a ratio of the cell area of the main photosensitive pixel to the cell area of the dependent photosensitive pixel.

According to the present invention, a black level correction value of the dependent photosensitive pixel is calculated from a black level correction value of the main photosensitive pixel, and therefore it is not necessary to perform control to capture an imaging signal from the dependent photosensitive pixel belonging to a light-blocking pixel portion for determining the black correction value of the dependent photosensitive pixel.

In addition, the black level correction value of the dependent photosensitive pixel can be calculated by multiplying the black level correction value of the main photosensitive pixel by the ratio of the cell area of the main photosensitive pixel to the cell area of the dependent photosensitive pixel as a factor.

Furthermore, if control to capture the imaging signal from the dependent photosensitive pixel is not performed in the light-blocking pixel portion, a processing system may be stopped during such a period. If the processing system is stopped during the period, contribution can be made to reduction in process and power conservation in the overall imaging apparatus.

BRIEF DESCRIPTION OF THE DRAWINGS

FIG. 6 is a table showing characteristics of a main photosensitive pixel and a dependent photosensitive pixel;

DETAILED DESCRIPTION OF THE PREFERRED EMBODIMENTS

The preferred embodiment of imaging apparatus according to the present invention will be described below according to the attached drawings.

Figure 1:
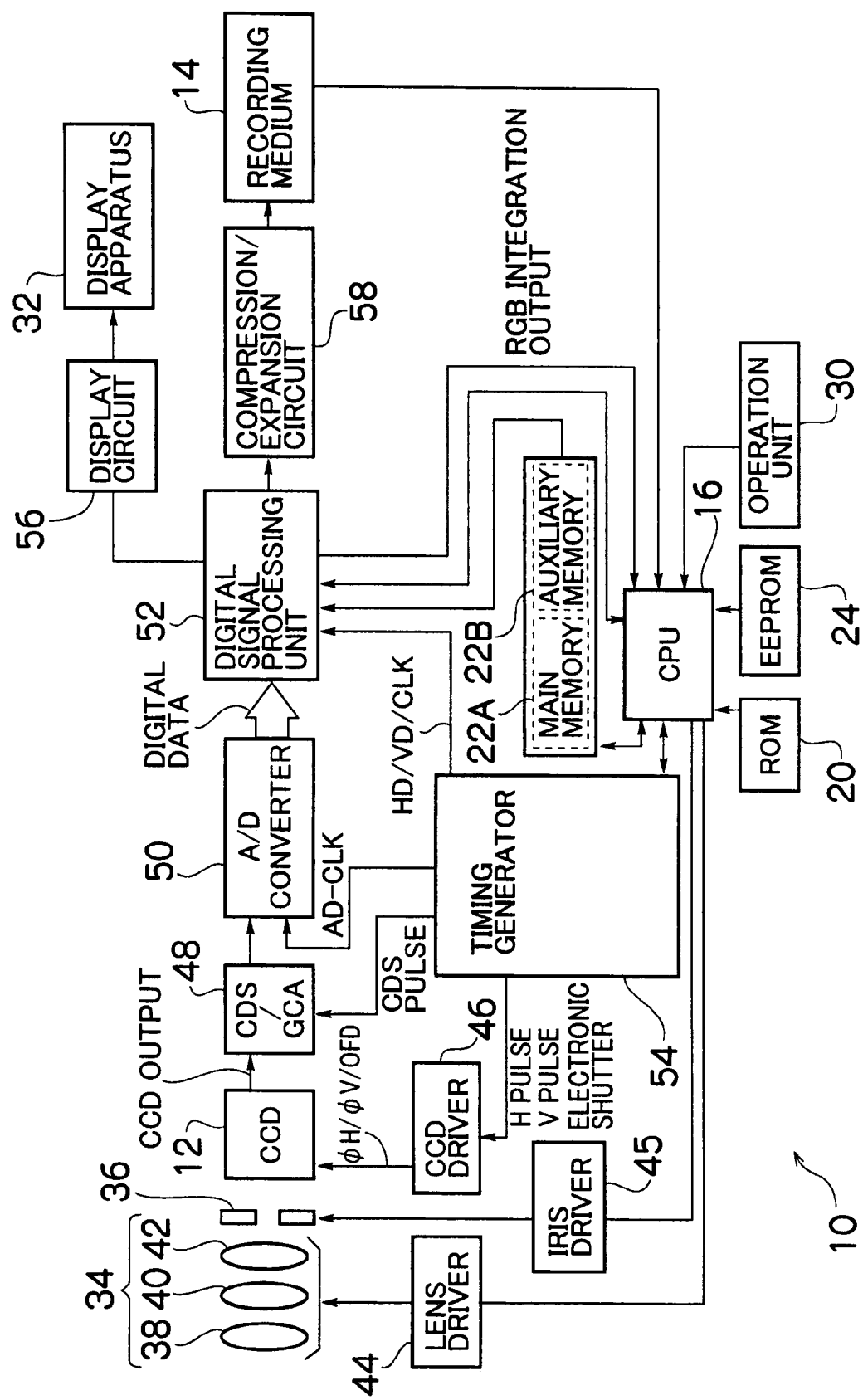
FIG. 1 is a block diagram of a digital camera according to the embodiment of the present invention.

FIG. 1 is a block diagram of a digital camera according to the embodiment of the present invention.

A digital camera 10 is such that an optical image of a subject picked up through a CCD solid-state imaging element (hereinafter referred to as CCD) 12 is converted into image data, and the image data is recorded in a recording medium 14.

The operation of the overall camera 10 is collectively controlled by a central processing unit (hereinafter referred to as CPU) 16 built in the camera. The CPU 16 functions as a controlling device which controls the camera system according to a predetermined program, and also functions as an operation device which performs various kinds of operations such as automatic exposure (AE) operations, automatic focus adjustment (AF) operations, and auto white balance (AWB) control.

The CPU 16 is connected to a ROM 20 and a memory (RAM) 22 through a bus. Programs executed by the CPU 16, various kinds of data required for control, and the like are stored in the ROM 20. The memory 22 is used as an area for expansion of programs and an operation work area of the CPU 16, and also used as an area for temporary storage of image data. A main memory 22A and a auxiliary memory 22B are provided in the area for temporary storage of image data.

In addition, an EEPROM 24 is connected to the CPU 16. The EEPROM 24 is a nonvolatile storage device in which data required for control of AE, AF, AWB and the like or customization information set by a user, and is capable of rewriting data as necessary, and contents of information are retained even when the power is off. The CPU 16 performs operations and the like referring to the EEPROM 24 as necessary.

The camera 10 is provided with an operation unit 30 for a user to input various kinds of commands. The operation unit 30 includes various kinds of operation units such as a shutter button, a zoom-in switch and a mode changeover switch. The shutter button is an operation device which inputs a command to start taking a picture, and is comprised of a two-stage stroke-type switch having an S1 switch that is turned on when the button is halfway-pressed, and an S2 switch that is turned on when the button is full-pressed. AE processing and AF processing is performed with S1 on, and light exposure for recording is performed with S2 on. The zoon-switch is an operation device which changes a photographing scaling factor and a regeneration scaling factor. The mode changeover switch is an operation device which makes the transition between a photographing mode and a regeneration mode.

Furthermore, the operation unit 30 also includes, in addition to the devices described above, a photographing mode setting device which sets an optimum operation mode (continuous-exposure mode, auto photographing mode, manual photographing mode, figure mode, landscape mode, night view mode, etc.) depending on photographing purposes, and operation devices such as a menu button for displaying a menu screen on a liquid crystal monitor (display apparatus) 32, a cross button (cursor shift operation button) for selecting a desired item from the menu screen, an OK button for providing a command to define a selected item or carry out a process, and a cancel button for inputting a command to delete a desired object such as a selected item, cancel directive contents, or make a return to an immediate preceding operation state.

Furthermore, the operation unit 30 includes not only configurations such as a push-type switch member, a dial member and a lever switch, but also configurations achieved through user interfaces such that a desired item is selected from a menu screen.

A signal from the operation unit 30 is inputted to the CPU 16. The CPU 16 controls each circuit of the camera 10 based on the input signal from the operation unit 30, and performs, for example, lens drive control, photographing operation control, image processing control, image data recording/regeneration control, display control of a liquid crystal monitor (display apparatus) 32.

The liquid crystal monitor 32 can be used as an electronic finder for checking an angle of view when a photograph is taken, and is also used as a device which regenerates and displaying a recorded image. In addition, the liquid crystal monitor 32 is also used as a display screen for user interfaces, on which information such as menu information, selection items and setting contents is displayed as necessary. Furthermore, in this embodiment, a liquid crystal display is used for the display apparatus, but a display apparatus (display device) of a different system such as an organic EL may also be used.

A photographing function of the camera 10 will now be described.

The camera 10 comprises an optical system including a photographing lens 34 and an iris and mechanical shutter mechanism 36, and a CCD 12. Furthermore, an imaging element of a different system such as an MOS-type solid-state imaging element can be used instead of the CCD 12. The photographing lens 34 is comprised of a motorized zoom lens, and mainly includes a scaling factor-variable lens group 38 effecting a scaling factor changing (or focal distance variable) action, a correction lens group 40, and a focus lens 42 contributing to focus adjustment.

When the zoom switch of the operation unit 30 is operated by a photographer, an optical system control signal is outputted from the CPU 16 to a lens driver 44 according to the switch operation. The lens driver 44 generates a signal for driving a lens based on the control signal from the CPU 16 and gives the signal to a zoom motor (not shown). In this way, the zoom motor is activated with a motor drive voltage outputted from the driver 44, and the scaling factor-variable lens group 38 and the correction lens group 40 in the photographing lens makes a back-and-forth motion along an optical axis, whereby the focus distance (optical zoom scaling factor) of the photographing lens 34 is changed.

In addition, the CPU 16 controls the iris and mechanical shutter mechanism 36 via an iris driver 45.

Light passing through the optical system enters the light-receiving surface of the CCD 12. A large number of photo sensors (light-receiving elements) are arranged in a plane form on the light-receiving surface of the CCD 12, and color filters of primary colors of red (R), green (G) and blue (B) are arranged in a predetermined arrangement structure in correspondence with each photo sensor.

A subject image formed on the light-receiving surface of the CCD 12 is converted by each photo sensor into an amount of signal charge corresponding to an amount of incident light. The CCD 12 has an electronic function to control charge accumulation time (shutter speed) of each photo sensor according to timing of a shutter gate pulse.

Signal charges accumulated in each photo sensor of the CCD 12 are sequentially read as voltage signals (imaging signals) corresponding to signal charges based on pulses given from a CCD driver 46, and image signals outputted from the CCD 12 are sent to an analog processing unit (CDS/GCA) 48. The analog processing unit 48 is a processing unit including a CDS (correlation double sampling) circuit and a GCA circuit (gain adjustment circuit) and in this analog processing unit 48, sampling processing and processing of color separation into color signals of R, G and B is performed, and the signal level of each color signal.

The image signal outputted from the analog processing unit 48 is converted into a digital signal by an A/D converter 50, and then stored in a memory 22 via a digital signal processing unit 52. A timing generator (TG) 54 gives timing signals to the CCD driver 46, the analog processing unit 48 and the A/D converter 50 according to a command by the CPU 16, and circuits are synchronized with the signals.

The digital signal processing unit 52 is a digital signal processing block also serving as a memory controller for controlling read/write in the memory 22. The digital signal processing unit 52 is an image processing device including an offset processing unit, a shading correction unit, a defective pixel (flaw) correction unit, an auto operation unit which performs AE/AF/AWB processing, a white balance circuit, a gamma conversion circuit, a synchronization circuit (processing circuit for correcting a spatial displacement of a color signal associated with a color filter arrangement of a single plate CCD), a luminance/color difference signal luminance/color difference signal generation circuit, a contour correction circuit and a contrast correction circuit, and an image signal is processed while making use of the memory 22 according to a command from the CPU 16.

Data (CCDRAW data) stored in the memory 22 is sent to the digital signal processing unit 52 via a bus. Image data inputted to the digital signal processing unit 52 is subjected to predetermined signal processing such as white balance adjustment processing, gamma conversion processing, and processing for conversion into a luminance signal (Y signal) and a color difference signal (Cr, Cb signal) i.e. YC processing, and then stored in the memory 22.

If a photographed image is monitor-outputted, image data is read from the memory 22, and sent to a display circuit 56. Image data sent to the display circuit 56 is converted into a signal of a predetermined mode for display (e.g. color combined image signal of NTSC mode), and then outputted to the liquid crystal monitor 32. Image data in the memory 22 is periodically rewritten by the image signal outputted from the CCD 12, and the image signal generated from the image data is supplied to the liquid crystal monitor 32, whereby an image being photographed (through image) is displayed on the liquid crystal monitor 32 in real time. A photographer can observe an angle of view (composition) by an image (so called a through movie) displayed on the liquid crystal monitor 32.

When the photographer determines an angle of view and presses the shutter button, then the CPU 16 detects this, and perform AE processing, AF processing and AWB processing in response to halfway-press of the shutter button (S1 on), and starts CCD exposure and read control for capturing an image for recording in response to full press of the shutter button (S2 on).

That is, the CPU 16 performs a various kinds of operations such as focus evaluation operations and AE operations from image data captured in response to SI on, sends a control signal to the lens driver 44 based on the result of the operations, and controls an AF motor (not shown) to shift the focus lens 42 to a focusing position.

In addition, the AE operation unit includes a circuit for dividing one screen of a photographed image into a plurality of areas (e.g. 16×16) and integrating RGB signals for each divided area, and supplies the integrated value to the CPU 16. The integrated value may be determined for each of color signals of RGB, or the integrated value may be determined for only one (e.g. G signal) of these color signals.

The CPU 16 performs weight summation based on the integrated value obtained from the AE operation unit, detects a brightness of a subject (subject luminance), and calculates an exposure value (photographing EV value) suitable for photographing.

For accurately carrying out photometry over a wide dynamic range, the AE of the camera 10 carries out photometry two or more times to recognize a luminance of a subject correctly. Provided that when photometry is carried out over a range of 5 to 17 EV, photometry can be carried out over a range of 3 EV with one-time photometry, for example, photometry is carried out four times at the maximum while changing exposure conditions.

Photometry is carried out under certain exposure conditions, and the integrated value of each divided area is monitored. If any saturated area exists in the image, photometry is carried out while changing exposure condition. On the other hand, if no saturated area exists in the image, photometry can be carried out correctly, and therefore a further change of exposure conditions is not made.

In this way, photometry can be carried out two or more times to perform photometry over a wide range e.g. 5 to 17 EV, and optimum exposure conditions are determined. Furthermore, a range that can or should be measured with one-time photometry can be designed for each type of camera.

The CPU 16 controls an iris and a shutter speed based on the result of AE operations described above, and acquires an image for recording in response to full press of the shutter button (S2 on).

Image data captured in response to S2 on is subjected to YC processing and other predetermined signal processing in the digital signal processing unit 52 shown in FIG. 1, and then compressed according to a predetermined format (e.g. JPEG format) in a compression/expansion circuit 58. The compressed image data is recorded in the recording medium 14 via a media interface unit (not shown). The compression format is not limited to JPEG format. For example, MPEG or other formats may be employed.

For the device which stores image data, a various kinds of media such as semiconductor memory cards represented by SmartMedia™, CompactFlash™, and the like, magnetic disks, optical disks and magneto optic disks. In addition, the device which stores image data is not limited to a removal medium, but may be a recording medium (internal memory) built in the camera 10.

When a regeneration mode is selected by a mode selection switch of the operation unit 30, a last image file recorded (file last recorded) in a recording medium 14 is read. Data of the image file read from the recording medium 14 is subjected to expansion processing by the compression and expansion circuit 58, and outputted to the liquid crystal monitor 32 through a display circuit 50.

By operating the cross button during one frame regeneration in a regeneration mode, the frame can be forwarded in a normal or inverse direction, a next file frame-forwarded is read from the recording medium 14, and a displayed image is updated.

Figure 2:
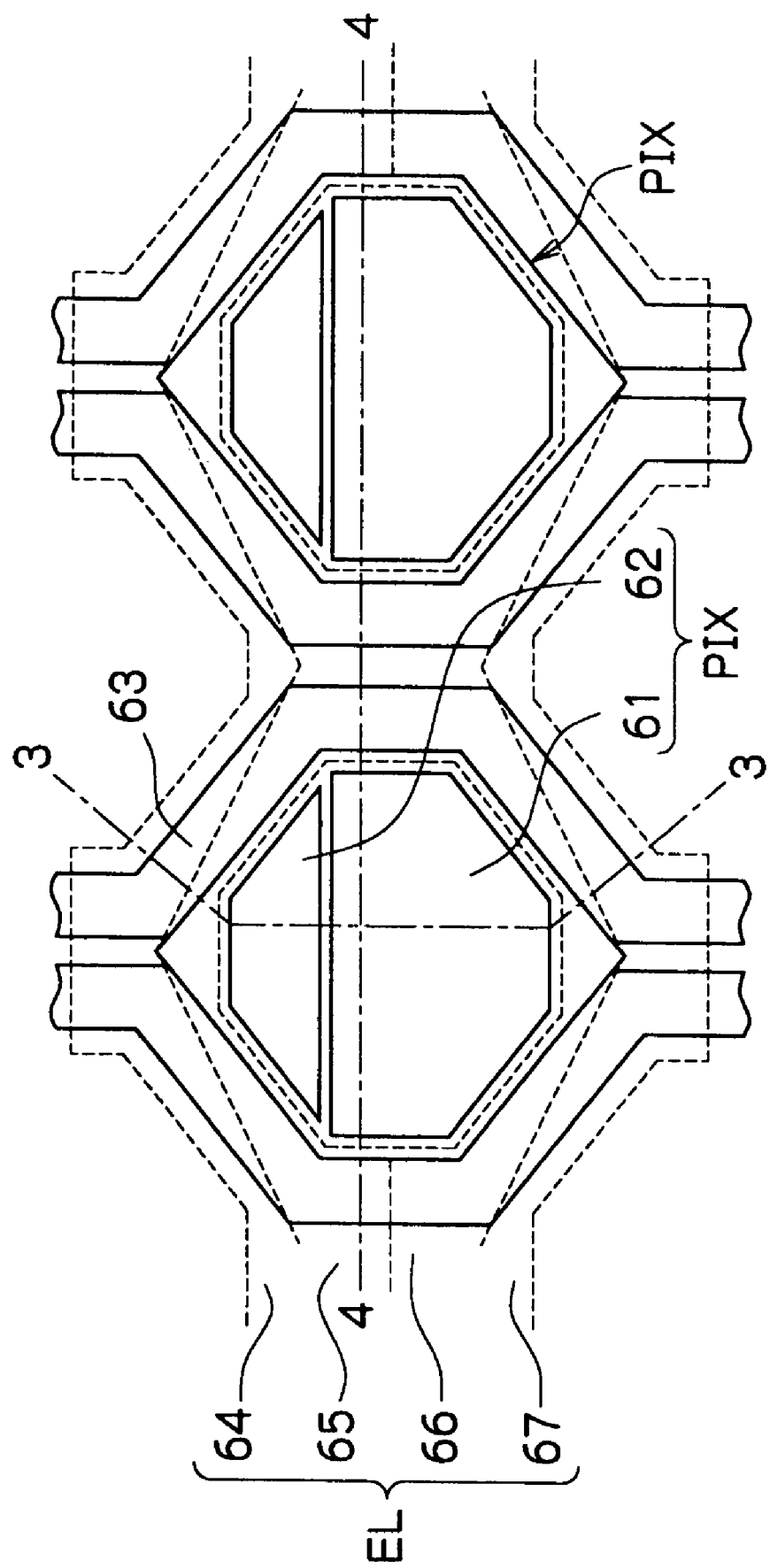
FIG. 2 is a plan view showing the structure of a light-receiving surface of a CCD shown in FIG. 1.

FIG. 2 is a plan view showing the structure of the light-receiving surface of the CCD 12. Two light-receiving cells (pixels PIX) arranged side by side is shown in FIG. 2 but actually, a large number of pixels PIX are arranged in the horizontal (longitudinal) direction and the vertical (transverse) direction at fixed arrangement pitches.

Each pixel PIX includes two photodiode areas 61 and 62 having different sensitivities. The first photodiode area 61 has a relatively large area, and constitutes a main photosensitive portion (hereinafter referred to as main photosensitive pixel). The second photodiode area 62 has a relatively small area, and constitutes a dependent photosensitive area (hereinafter referred to as dependent photosensitive pixel). A vertical transfer channel (VCCD) 63 is formed on the right side of the pixel PIX.

The structure shown in FIG. 2 is a pixel arrangement of honeycomb structure, and two upper and lower pixels PIX shown in this figure are placed at positions displaced with respect to each other by half a pitch in the lateral direction. The vertical transfer channel 63 shown on the left side of pixels PIX shown in FIG. 2 is intended for reading charges from pixels (not shown) placed on the upper and lower sides of these pixels PIX, and transferring the charges.

As shown by broken lines in FIG. 2, transfer electrodes 64, 65, 66 and 67 (collectively denoted by EL) required for four-phase drive ($\phi1$, $\phi2$, $\phi3$, $\phi4$) are placed above the vertical transfer channel 63. If the transfer electrode is constituted by two-layer polysilicon, for example, the first transfer electrode 64 to which a pulse voltage of $\phi1$ is applied, and the third electrode 66 to which a pulse voltage of $\phi3$ is applied are constituted by a first-layer polysilicon layer, and the second transfer electrode 65 to which a pulse voltage of $\phi2$ is applied, and the fourth electrode 67 to which a pulse voltage of $\phi4$ is applied are constituted by a second-layer polysilicon layer. Furthermore, the transfer electrode 64 also controls the reading of charges from the dependent photosensitive pixel 62 to the vertical transfer channel 63. The transfer electrode 65 also controls the reading of charges from the main photosensitive pixel 61 to the vertical transfer channel 63.

Figure 3:
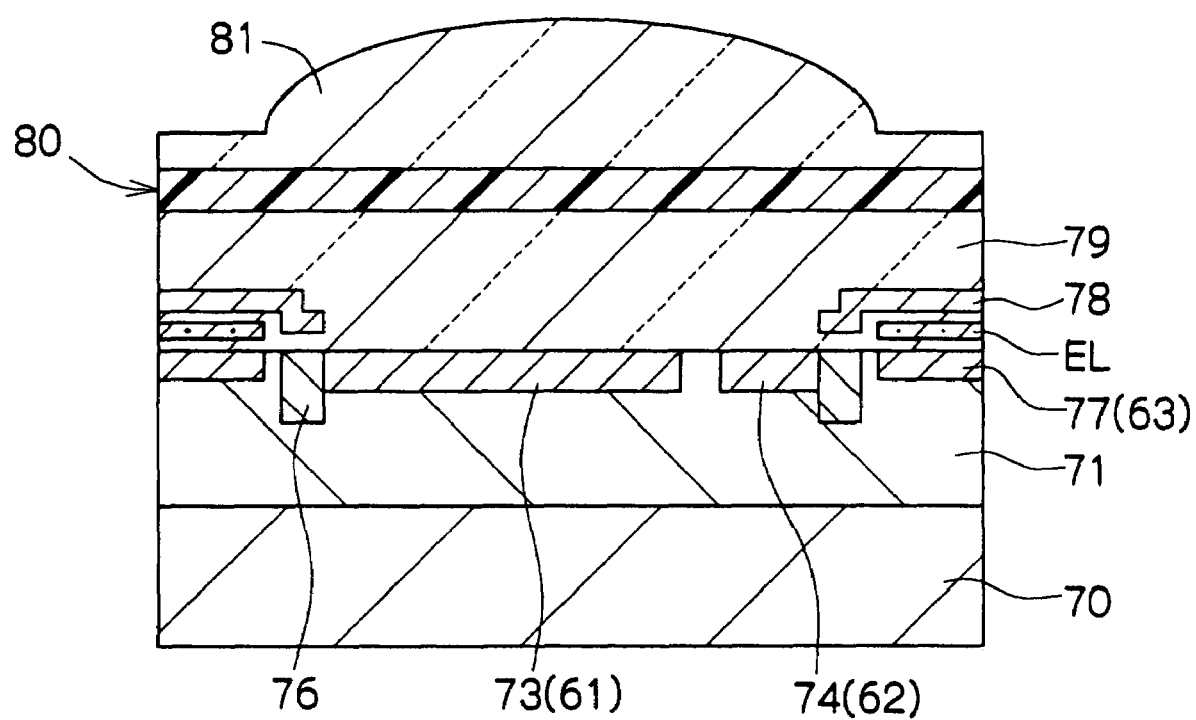
FIG. 3 is a sectional view taken along the 3-3 line of FIG. 2.
Figure 4:
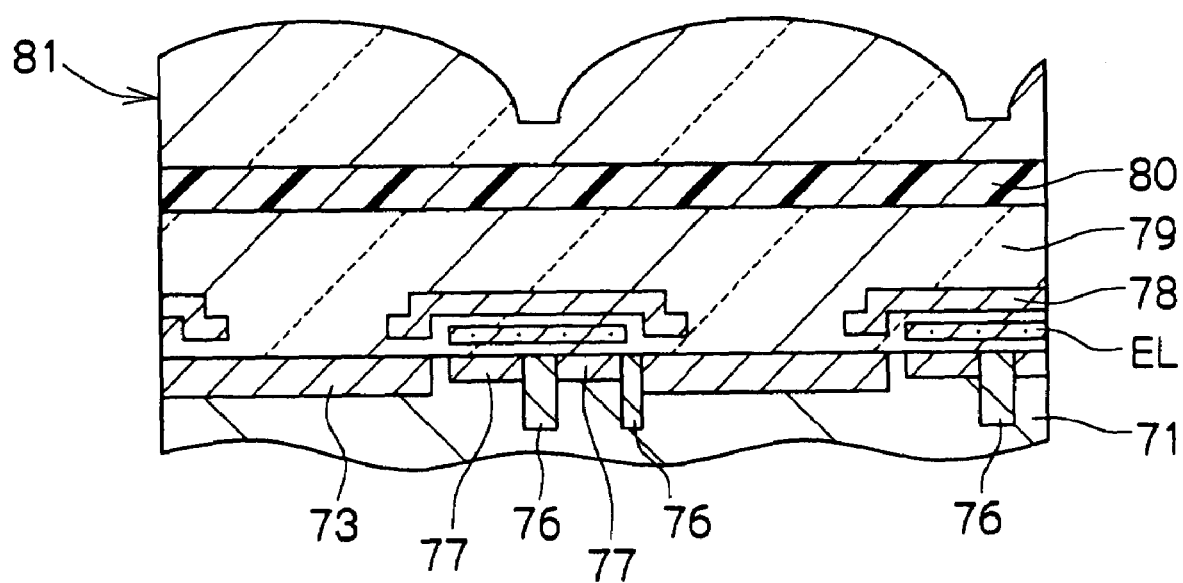
FIG. 4 is a sectional view taken along the 4-4 line of FIG. 2.

FIG. 3 is a sectional view taken along the 3-3 line of FIG. 2, and FIG. 4 is a sectional view taken along the 4-4 line of FIG. 2. As shown in FIG. 3, a p-type well 71 is formed on one surface of an n-type semiconductor substrate 70. Two n-type areas 73 and 74 are formed on a surface area of the p-type well 71 to form a photodiode. A photodiode in an n-type area denoted by reference numeral 73 corresponds to the main photosensitive pixel 61, and a photodiode in an n-type area denoted by reference numeral 74 corresponds to the dependent photosensitive pixel 62. A p+-type area 76 is a channel stop area where pixels PIX, the vertical transfer channel 63 and the like are electrically separated.

As shown in FIG. 4, an n-type area 77 constituting the vertical transfer channel 63 is placed near the n-type area 73 constituting the photodiode. The p-type well 71 between n-type areas 74 and 77 constitutes a reading transistor.

An insulation layer such as silicon oxide film is formed on the surface of the semiconductor substrate, and the transfer electrode EL made of polysilicon is formed thereon. The transfer electrode EL is so situated as to cover the upper part of the vertical transfer channel 63. An insulation layer of silicon oxide or the like is further formed on the transfer electrode EL, and a light-blocking film 78 covering components such as the vertical transfer electrode 63 and having an opening above the photodiode is formed thereon by tungsten or the like.

An interlayer insulation film 79 made of phosphosilicate glass or the like is formed in such a manner as to cover the light-blocking film 78, and the surface of the film is flattened. A color filter layer 80 is formed on the interlayer insulation film 79. The color filter layer 80 includes color areas of three or more colors such as red, green and blue areas, for example, and a color area of one color is assigned for each pixel PIX.

On the color filter layer 80, micro-lenses 81 are formed by a resist material or the like in correspondence with pixels PIX. One micro-lens 81 is formed on each pixel PIX, and has a function of collecting light incident from above in the opening delimited by the light-blocking film 78.

Light incident through the micro-lens 81 is color-separated through the color filter layer 80, and enters each photodiode area of the main photosensitive pixel 61 and the dependent photosensitive pixel 62. Light entering each photodiode area is converted into a single charge corresponding to the amount of light, and individually read out to the vertical transfer channel 63.

In this way, two types of image signals of different sensitivities (high sensitivity image signal and low sensitivity image signal) can be individually acquired from one pixel PIX, and image signals of optically same phases are obtained.

Figure 5:
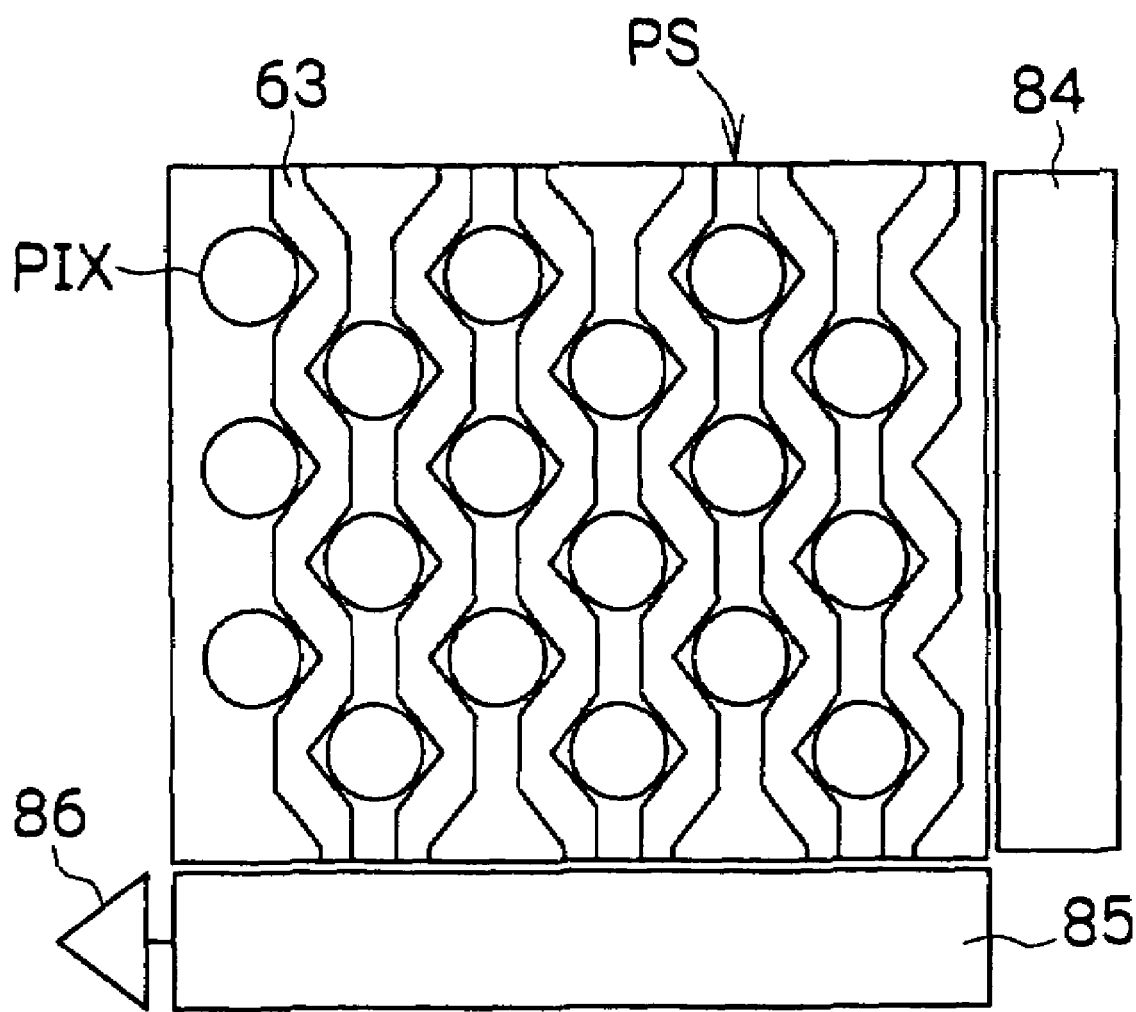
FIG. 5 is a schematic plan view showing the overall configuration of the CCD shown in FIG. 1.

FIG. 5 shows the arrangement of pixels PIX and the vertical transfer channel 63 in the light-receiving area PS of the CCD 12. Pixels PIX are arranged in a honeycomb structure such that central points of geometric shapes of cells are shifted in an alternate manner by half the pixel pitch (½ pitch) in longitudinal and transverse directions. That is, in lines (or rows) of pixels PIX adjacent to each other, a cell arrangement in one line (or row) is shifted by almost ½ of the arrangement space in the longitudinal (or transverse) direction relative to a cell arrangement in the other line (or row).

A VCCD drive circuit 84 applying a pulse voltage to the transfer electrode EL is placed on the right side of the light-receiving area PS in which pixels PIX are arranged in FIG. 5. As described above, each pixel PIX includes the main photosensitive portion (main pixel) and the dependent photosensitive portion (dependent pixel). The vertical transfer channel 63 is placed near each row in a zigzag form.

In addition, a horizontal transfer channel (HCCD) 85 transferring in the horizontal direction a signal charge transferred from the vertical transfer channel 30 is provided on the lower side of the light-receiving area PS (on the lower end side of the vertical transfer channel 63).

The horizontal transfer channel 85 is constituted by a transfer CCD of two-phase drive, and the last stage of the horizontal transfer channel 85 (leftmost stage in FIG. 5) is connected to an output unit 86. The output unit 86 includes an output amplifier, detects an inputted signal charge, and outputs the charge to an output terminal as a signal voltage. In this way, signals photoelectrically converted in pixels PIX are outputted as a dot sequential signal row.

The characteristics of the main photosensitive pixel 61 and the dependent photosensitive pixel 62 in this embodiment are shown in FIG. 6.

The sensitivity is a ratio of an opening area of the main photosensitive pixel to an opening area of the dependent photosensitive pixel, and the ratio of the opening area of the main photosensitive pixel to the opening area of the dependent photosensitive pixel is 1:1/16.

The saturation is a ratio of a cell area of the main photosensitive pixel to a cell area of the dependent photosensitive pixel, and the ratio of the cell area of the main photosensitive pixel to the cell area of the dependent photosensitive pixel is 1:¼.

In addition, the ratio of the dynamic range of the main photosensitive pixel to that of the dependent photosensitive pixel is 1:4.

Figure 7:
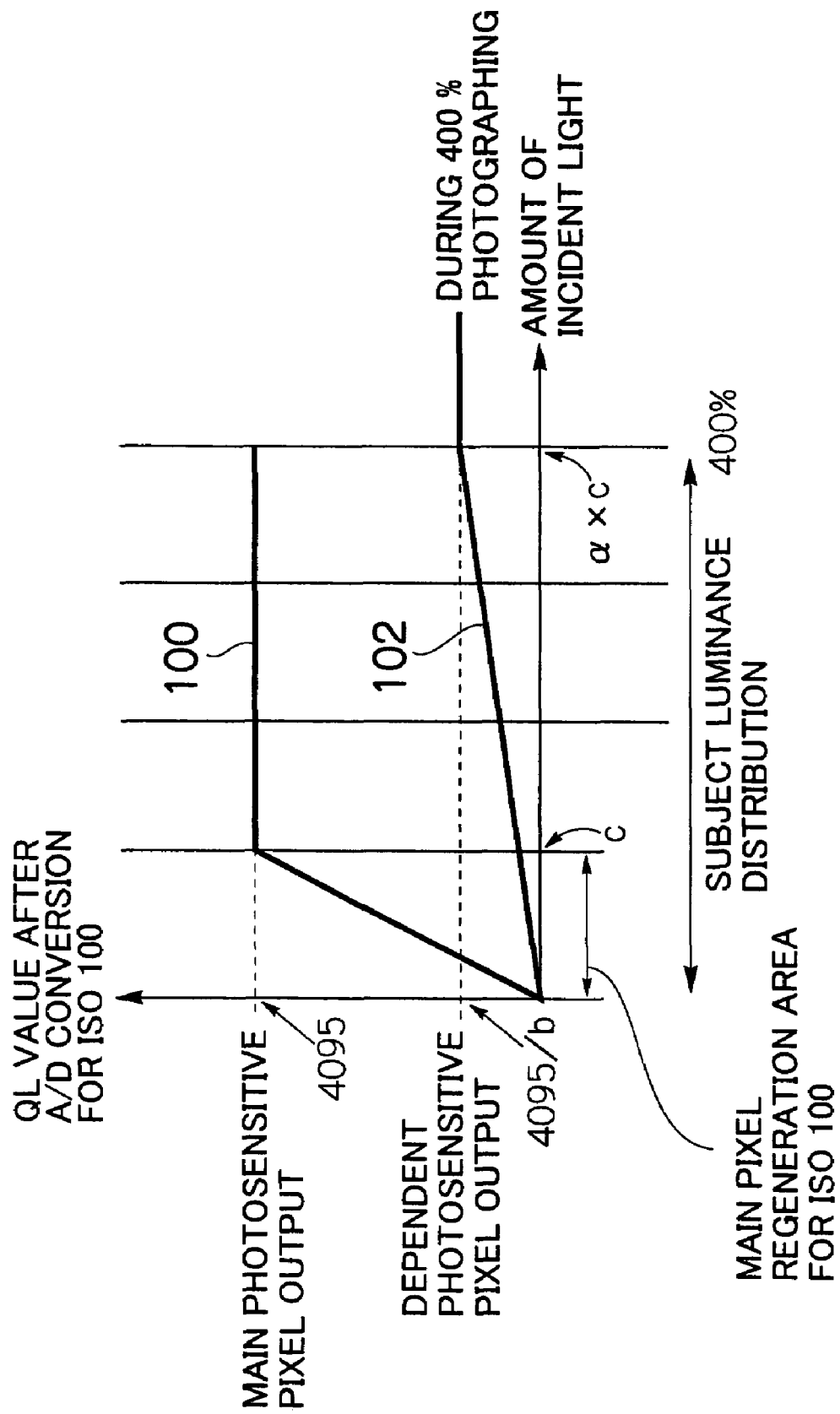
FIG. 7 is a graph showing photoelectric conversion characteristics of the main photosensitive pixel and the dependent photosensitive pixel.

FIG. 7 is a graph showing the photoelectric conversion characteristics of the main photosensitive pixel 61 and the dependent photosensitive pixel 62. The lateral axis shows the amount of incident light, and the longitudinal axis shows the image data value after A/D conversion (QL value). In this Example, 12-bit data is shown as an example, but the number of bits is not limited thereto.

As shown in FIG. 7, the sensitivity ratio between the main photosensitive pixel 61 and the dependent photosensitive pixel 62 is 1:1/a (a>1; a=16 in this embodiment). An output 100 of the main photosensitive pixel 61 gradually increases in proportion to the amount of incident light, and the output reaches a saturated value (QL value=4095) when the amount of incident light is "c". Thereafter, the output of the main photosensitive pixel 61 remains constant even if the amount of incident light increases. The "c" is called a saturated light amount of the main photosensitive pixel 61.

On the other hand, the sensitivity of the dependent photosensitive pixel 62 is 1/a of that of the main photosensitive pixel 61, and an output 102 of the dependent photosensitive pixel is saturated at the QL value=4095b when the amount of incident light is α×c (b>1, α=a/b; b=4, α=4 in this embodiment). "α×c" at this time is called a saturated light amount of the dependent photosensitive pixel 62.

In this way, by combining the main photosensitive pixel and the dependent photosensitive pixel having different sensitivities, the dynamic range of the CCD 12 can be increased by a factor of α (by a factor of 4 in this embodiment) compared to the configuration of only the dependent photosensitive pixel.

The photoelectric conversion characteristics of the main photosensitive pixel 61 and the dependent photosensitive pixel 62 shown in FIG. 7 are measured in the central area of the screen. In addition, measurement conditions are reference conditions defined in inspection steps (predetermined position of exit pupil, predetermined iris value and predetermined shutter speed).

AE processing and AF processing associated with S1 on of the shutter button is performed based on a signal obtained from the main photosensitive pixel 61. If a photographing mode in which wide dynamic range imaging is performed is selected, or the wide dynamic range imaging mode is automatically selected as a result of AE (ISO sensitivity and photometric value) or based on a white balance gain value or the like, the CCD 12 is exposed to light in response to S2 on of the shutter button and after the exposure, a charge of the main photosensitive pixel 61 is first read in synchronization with a vertical drive signal (ΦV) with the mechanical shutter closed to block entrance of light, and the read charge is stored in the auxiliary memory 22A shown in FIG. 1. Thereafter, a charge of the dependent photosensitive pixel 62 is read and the read charge is stored I the auxiliary memory 22B shown in FIG. 1.

Processing of output signals of the CCD 12 will be described below.

Figure 8:
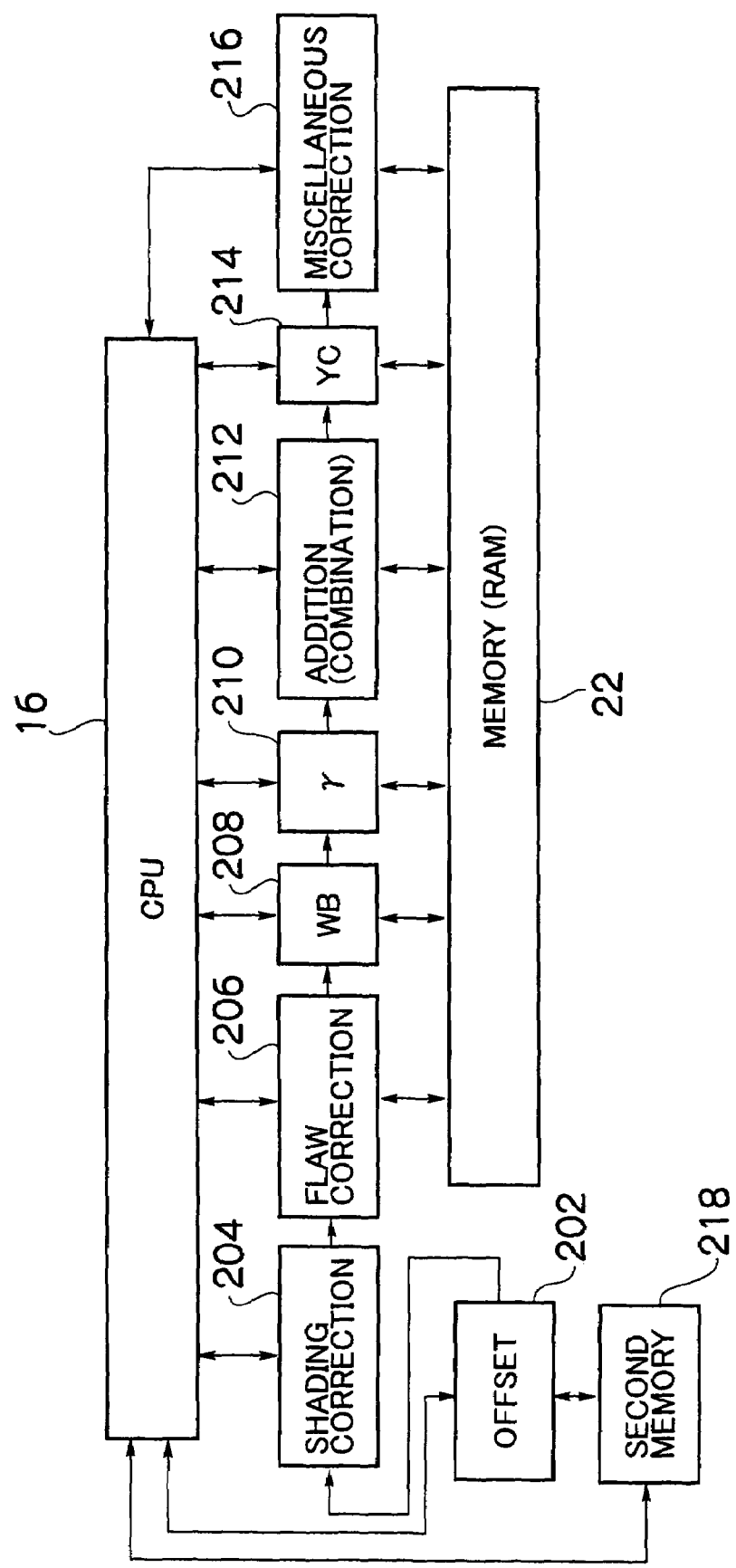
FIG. 8 is a block diagram showing the detailed configuration of a signal processing unit shown in FIG. 1.

FIG. 8 is a block diagram showing the detailed configuration of the digital signal processing unit 52 shown in FIG. 1.

The signal processing unit 52 includes an offset processing unit 202, a shading correction unit 204, a flaw correction unit 206, a white balance (WB) gain unit 208, a gamma correction unit 210, an addition unit 212, a YC conversion unit 214, a miscellaneous correction unit 216, and a second memory 218 storing correction values that are consulted by the offset processing unit 202. For the second memory 218, a memory built in the CPU 16 may be used.

The offset processing unit 202 is a processing unit which corrects dark current components of the CCD output, and performs an operation of subtracting from a pixel value a value of an optical black (OB) signal obtained from a light-blocking pixel on the CCD 12. An OB signal is converted into a digital signal, and stored in the second memory 218.

The shading correction unit 204 is a processing unit which corrects ununiformity of the CCD output associated with variation in light amount distribution caused by an optical system, and multiplies a pixel value by a correction coefficient previously prepared according to the position of the pixel PIX to uniformalize the output level.

Furthermore, since the main photosensitive pixel 61 and the dependent photosensitive pixel 62 are different in phenomenon of occurrence of luminance shading, different shading correction is carried out for the pixel value of the main photosensitive pixel 61 and the pixel value of the dependent photosensitive pixel 62. The periphery of the screen tends to be dark compared to the central area of the screen in shading of the main photosensitive pixel 61, and unique shading (e.g. phenomenon such that the light amount in the periphery increases compared to the light amount in the central area of the screen) occurs in relation to the position of the micro-lens 81 and the position in the pixel PIX at which the dependent photosensitive pixel is formed in shading of the dependent photosensitive pixel 62. Signal correction processing for eliminating these phenomena is carried out according to the shading patterns of the main photosensitive pixel 61 and the dependent photosensitive pixel 62.

The flaw correction unit 206 is a processing unit which corrects a signal value of a defective pixel of the CCD 12. The defect of the pixel PIX has three aspects including:

the case where only the main photosensitive pixel 61 is flawed;

the case where only the dependent photosensitive pixel 62 is flawed; and the case where both the main photosensitive pixel 61 and dependent photosensitive pixel 62 are flawed.

Flaw correction methods for coping with the three aspects described above include a conventional (lowpass filter-type) method of using pixel values of pixels PIX around a defective pixel are used to carry out correction, and a method of using the pixel value of a normal dependent photosensitive pixel or main photosensitive value in the same pixel PIX to carry out correction, and the correction method can be changed depending on a situation.

Image data obtained by carrying out flaw correction processing by the flaw correction unit 206 is stored in the memory 22 as CCDRAW data. CCDRAW data stored in the memory 22 is sent to the WB gain unit 208.

The WB gain unit 208 includes a gain variable amplifier for increasing and decreasing the levels of color signals of R, G, and B, and performs gain adjustment of each color signal based on a command from the CPU 16. A signal subjected to gain processing in the WB gain unit 208 is sent to the gamma correction unit 210.

The gamma correction unit 210 converts input/output characteristics so that they become desired gamma characteristics according to a command of the CPU 16. An image signal subjected to gamma correction is sent to the addition unit 212. The addition unit 212 is a processing unit adds (combines) an image signal obtained from the main photosensitive pixel and an image signal obtained from the dependent photosensitive pixel, and generates an output signal according to the following equation;

Output signal=$g \times$(signal of main photosensitive pixel)+$(1-g) \times$(signal of dependent photosensitive pixel)

wherein the coefficient g representing an addition ratio can be set as appropriate as long as the requirement of $0 \leq g \leq 1$ is met. The CPU 16 variably sets the coefficient g depending on a situation.

The output signal from the addition unit 212 is sent to the YC processing unit 214. The YC processing unit 214 includes a synchronization processing unit which interpolates spatial deviations of color signals associated with the color filter arrangement structure of the single plate CCD 12 to calculate the color (RGB) of each point, and a YC conversion processing unit which generates luminance/color difference signals from RGB signals.

The luminance/color difference signal (YCrCb) generated by the YC processing unit 214 is sent to the miscellaneous correction unit 216. The miscellaneous correction unit 216 includes, for example, a contour enhancement (aperture correction) unit and a color correction unit with a color difference matrix.

Figure 9:
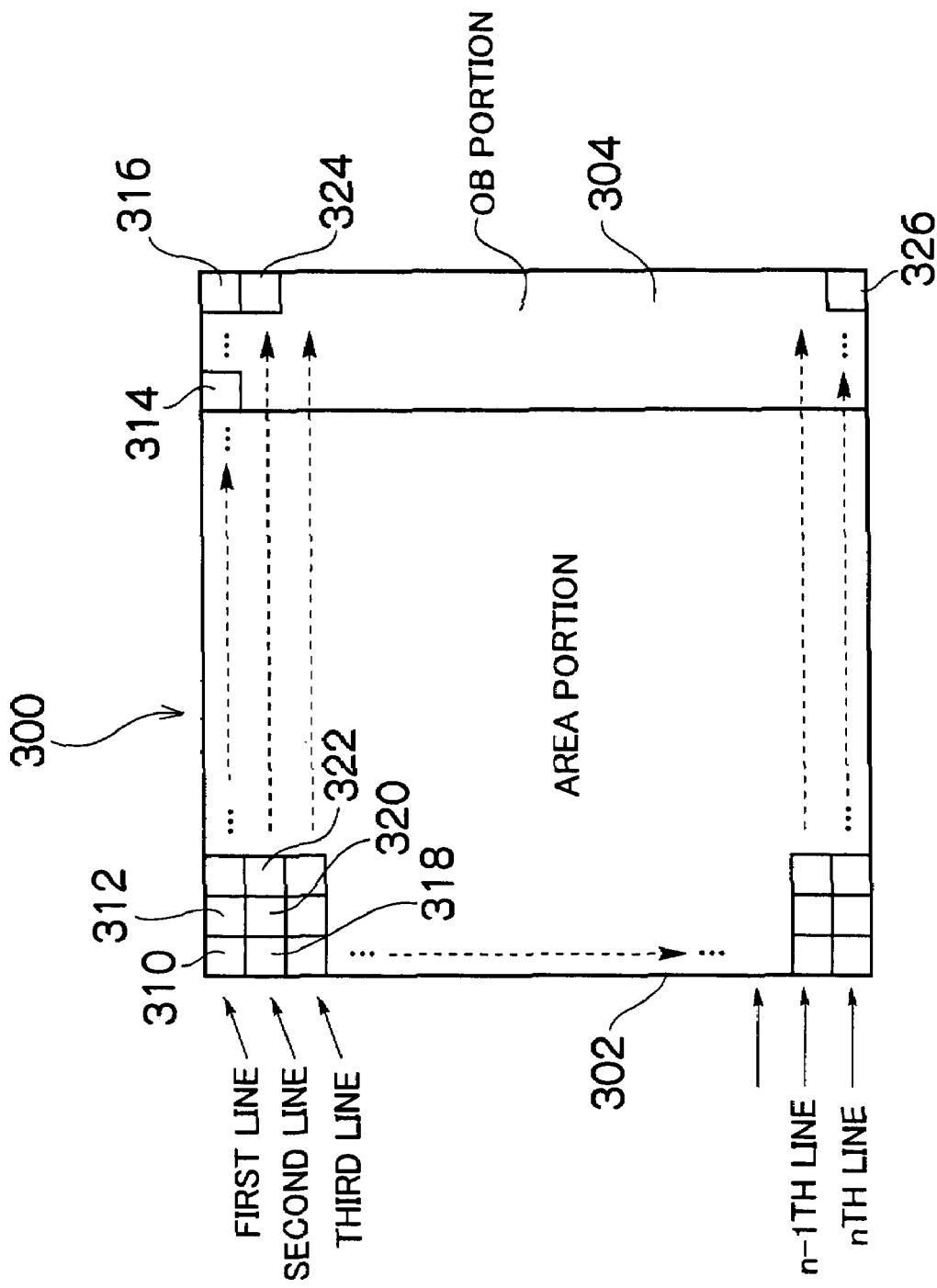
FIG. 9 shows a pixel layout and an area layout in a light-receiving area of the CCD shown in FIG. 1.

FIG. 9 shows a layout of pixels and a layout of areas in a light-receiving area 300 of the CCD 12 shown in FIG. 1. The light-receiving area 300 is comprised of a photosensitive pixel portion (hereinafter referred to as area portion) 302 where an imaging signal is outputted, and a light-blocking pixel portion (optical black portion, hereinafter referred to as OB portion) 304 where an OB signal is obtained.

In FIG. 9, the OB portion 304 is placed on the right side of the area portion 302, but the OB portion 304 may be situated on the left side of the area portion 302, In addition, the OB portion 304 may be so situated to surround the area portion 302.

In addition, pixels PIX shown in FIGS. 2 to 4 are arranged in a pixel arrangement of honeycomb structure in the light-receiving area 300. As shown in FIG. 2, two upper and lower pixels PIX shown in this figure are placed at positions displaced with respect to each other by half a pitch in the lateral direction.

Processing for capturing imaging signals from the pixel PIX of the light-receiving area 300 is carried out as follows.

As described with FIG. 5, when imaging signals are read from the CCD 12, accumulated charges are first read out to the vertical transfer channel (VCCD) 83 at a time, and they are each shifted by one line and read out to the horizontal transfer channel (HCCD) 85.

The horizontal transfer channel 85 is shifted one after another in the output direction to output signals equivalent to one horizontal line. Output signals (imaging signals) obtained in this way are sent to signal processing systems following the A/D converter 50 shown in FIG. 1, and subjected to predetermined signal processing.

Imaging signals outputted from the CCD 12 are captured as follows.

The pixel PIX shown in FIG. 9 has pixel rows (lines) each formed by n pixels in left and right directions in FIG. 9, and the aforesaid lines are a first line, a second line, . . . , an mth line in descending order from the top to the bottom in FIG. 9. Here, m represents the number of pixels in the longitudinal direction in the light-receiving area 300. The number of pixels n in one line multiplied by the number of pixels m in the longitudinal direction equals the total number of pixels of the CCD 12.

For capturing imaging signals, imaging signals are first captured from all main photosensitive pixels in the light-receiving area 300, and then imaging signals are captured from all dependent photosensitive pixels in the light-receiving area 300.

First, an imaging signal is captured from the main photosensitive pixel of a pixel 310 at the leftmost end of the first line. Then imaging signals are captured from main photosensitive pixels of the first line rightward (in the direction shown by a broken line in FIG. 9) from the leftmost end in FIG. 9 along the first line in the order of the main photosensitive pixel of a pixel 312, the main photosensitive pixel of a pixel 314 and a pixel 316. Furthermore, signs between the pixel 312 and the pixel 314 and between the pixel 314 and the pixel 316 are not shown here.

When read of imaging signals from main photosensitive pixels of the first line is finished, then imaging signals are captured from main photosensitive pixels of the second line.

Imaging signals are read rightward from the leftmost end in FIG. 7 along the second line with an imaging signal first read from the main photosensitive pixel of a pixel 318 in the same manner as in read of imaging signals from main photosensitive pixels of the first line. Then, imaging signals are captured from main photosensitive pixels in the order of the main photosensitive pixel of a pixel 320, the main photosensitive pixel of a pixel 322, . . . , the main photosensitive pixel of a pixel 324.

When capture of imaging signals from main photosensitive pixels of the second line is finished, capture of imaging signals from main photosensitive pixels of the third line is started. In this way, imaging signals are captured from main photosensitive pixels of lines up to the nth lines.

When capture of imaging signals from main photosensitive pixels of lines up to nth lines is finished, capture of imaging signals of dependent photosensitive pixels of the first line is started. For capture of imaging signals from independent photosensitive pixels, imaging signals are captured from independent pixels of the first line, the second line, . . . , the mth line as in the case of capture of imaging signals from main photosensitive pixels. When capture of an imaging signal from the dependent photosensitive pixel of a pixel 326 at the rightmost end of the mth line is finished, processing for capturing imaging signals in the screen is ended.

Furthermore, signs between the pixel 322 and the pixel 324 and between the pixel 324 and the pixel 326 are not shown here.

In this embodiment, processing for capturing imaging signals obtained from the CCD 12 is illustrated as above, but processing for capturing imaging signals obtained from the CCD 12 is not limited thereto, and may be arbitrarily set according to control of a signal processing system which processes captured signals, and the structure of the CCD 12. Particularly, the upper, lower, left and right in FIG. 9 are arbitrarily defined for convenience in explanation.

In addition, the vertical transfer channel 83 and the horizontal transfer channel 85 shown in FIG. 5 are not shown in FIG. 9 for convenience in explanation. The horizontal transfer channel 83 of FIG. 5 is placed on the right of the OB portion 304 in FIG. 9, and the vertical transfer channel 85 of FIG. 5 is placed on the upper side of the area portion 302 and the OB portion 304 in FIG. 9.

Figure 10:
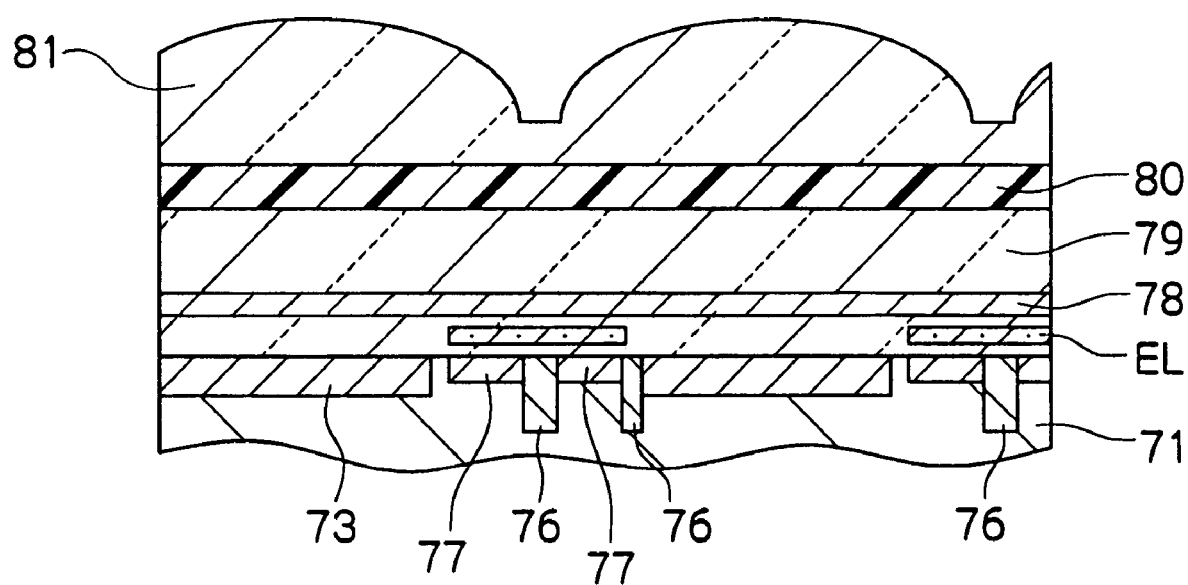
FIG. 10 is a sectional view taken along the 4-4 line of FIG. 2 of the CCD of the OB portion.

FIG. 10 is a sectional view of the pixel PIX of the OB portion. FIG. 10 is a sectional view taken along the 4-4 line shown in FIG. 2. Furthermore, in FIG. 10, parts identical or similar to those of FIG. 4 are given like symbols, and descriptions thereof are not presented.

In the OB portion 304 shown in FIG. 9, the n-type area 73 of each pixel and the n-type area corresponding to the dependent pixel 62 of FIG. 2 (not shown in FIG. 8, and corresponding to the area 74 of FIG. 3) have the upper part covered by the light-blocking film 78. However, structures other than this are same as those shown in FIGS. 3 and 4, and the interlayer insulation film 79 is formed in such a manner as to cover the light-blocking film 78, and the color filter layer 80 is formed on the interlayer insulation film. Furthermore, micro-lenses 81 are formed on the cooler filter layer 80 in correspondence to pixels PIX. One micro-lens 81 is formed on each pixel PIX.

In the OB portion 304 shown in FIG. 9, the pixel PIX is covered with a light-blocking film, and no incident light enters a photodiode, but an OB signal having a subtle voltage is outputted from the pixel PIX of the OB portion 304.

Generally, the photodiode has charges accumulated therein with time even in a light-blocking state, and the charge is called a dark current. Factors responsible for the dark current include mostly electrons thermally exited in a depletion layer of a p-n junction and a generation-recombination current by a positive hole.

The OB signal is caused by the dark current described above, and the OB signal may cause a fixed noise to occur in the image. For obtaining a preferred image, the imaging signal should be corrected according to a black level correction value determined from the OB signal.

The black level correction by signal processing will now be described in detail.

Figure 11:
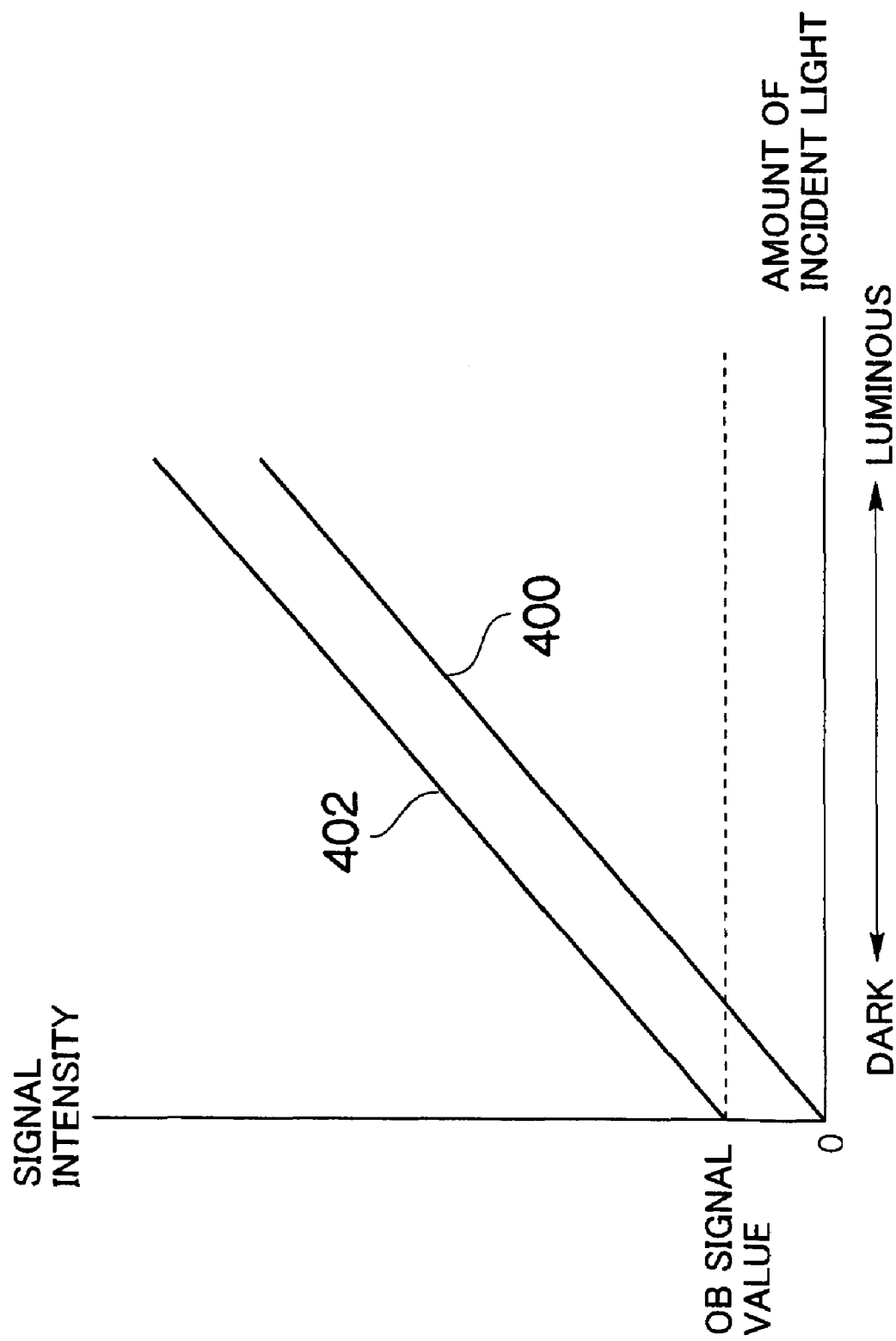
FIG. 11 is a graph showing a relation between the amount of incident light and the intensity of an output signal in the CCD shown in FIG. 1.

FIG. 11 is a graph showing a relation between the amount of incident light in the CCD 12 and the intensity of a signal outputted from the CCD 12.

Symbol 400 denotes ideal characteristics of the amount of incident light in the CCD 12 and the intensity of the output signal, in which the signal intensity is zero when the amount of incident light is zero, and the signal intensity increases in proportion as the amount of incident light increases (high-luminance light enters).

On the other hand, symbol 402 denotes actual characteristics of the amount of incident light in the CCD 12 and the intensity of the output signal, in which the output signal is generated even when the amount of incident light is zero. The output value when the amount of incident light is zero is an OB signal value, Subtraction of the OB signal value from the output value of an actually outputted signal (symbol 402) provides ideal characteristics (symbol 400) of the amount of incident light and the intensity of the output signal, thus making it possible to perform black level correction.

However, the dark current generated from the photodiode changes with temperature, and the dark current becomes almost twice as temperature rises by 10° C. In addition, individual differences of the photodiode should be considered. Thus, it can be considered that an average value of OB signals obtained from a plurality of pixels of the OB portion 304 shown in FIG. 9 is determined, and a black level correction value is determined from the average value of OB signals.

As shown in FIG. 9, capture of imaging signals from main photosensitive pixels of the CCD 12 is carried out in the order of the area portion of the first line, the OB portion of the first line, the area portion of the second line, the OB portion of the second line, . . . , the area portion of the nth line and the OB portion of the nth line. Imaging signals are captured from the area portion of each line, OB signals are then captured from the OB portion of each line, an average value of OB signals is determined for each line, and the value thus determined is defined as a black level correction value. The black level correction value determined for each line is stored in the second memory 218 shown in FIG. 8.

In the offset processing unit 202 shown in FIG. 8, black level correction can be performed by subtracting the black level correction value of each line stored in the second memory 218 from the imaging signal obtained from the area portion of each line.

In this embodiment, a black level correction value is determined for each line, and imaging signals in the same line are corrected, but imaging signals may be corrected using a black level correction value of the immediately preceding line, or a black level correction value determined for each line may be added on after another to determine an average value. Furthermore, pre-exposure may be performed before starting photographing and a black level correction value may be determined from the imaging signal obtained during pre-exposure. At this time, it is possible to acquire signals from the entire area of the OB portion and determine the average value of these signals.

In addition, imaging signals of the OB portion 304 are captured after imaging signals of the area portion 302 shown in FIG. 9 are captured, but imaging signals of the area portion 302 may be captured after imaging signals of the OB portion 304 are captured.

The black level correction described above can be applied to both the main photosensitive pixel and dependent photosensitive pixel. However, there is the relation shown in FIGS. 6 and 7 between the main photosensitive pixel and the dependent photosensitive pixel, and therefore the relation can be used to determine a black level correction value of the dependent photosensitive pixel.

The form will now be described in which a computation is applied on a correction value obtained from the main photosensitive pixel to determine a correction value of the dependent photosensitive pixel.

As shown in FIG. 6, the saturation ratio between the main photosensitive pixel and the dependent photosensitive pixel in the same pixel is 1:¼, and this is equal to the cell area ratio between the main photosensitive pixel and the dependent photosensitive pixel. Using this characteristic, a black level correction value of the main photosensitive pixel is multiplied by the cell area ratio (sensitivity ratio) of 1/4 as a factor, and the resultant value is defined as a black level correction value of the dependent photosensitive pixel.

In addition, for a correction value other than the black level correction value, a correction value determined from the main photosensitive pixel can be multiplied by the cell area ratio to determine a correction value of the dependent photosensitive pixel. In addition, not only the cell area ratio but also the sensitivity ratio may be used as a factor. However, consideration should be given to which is better as a factor, the cell area ratio or the sensitivity ratio, depending on the correction value to be determined.

Figure 12:
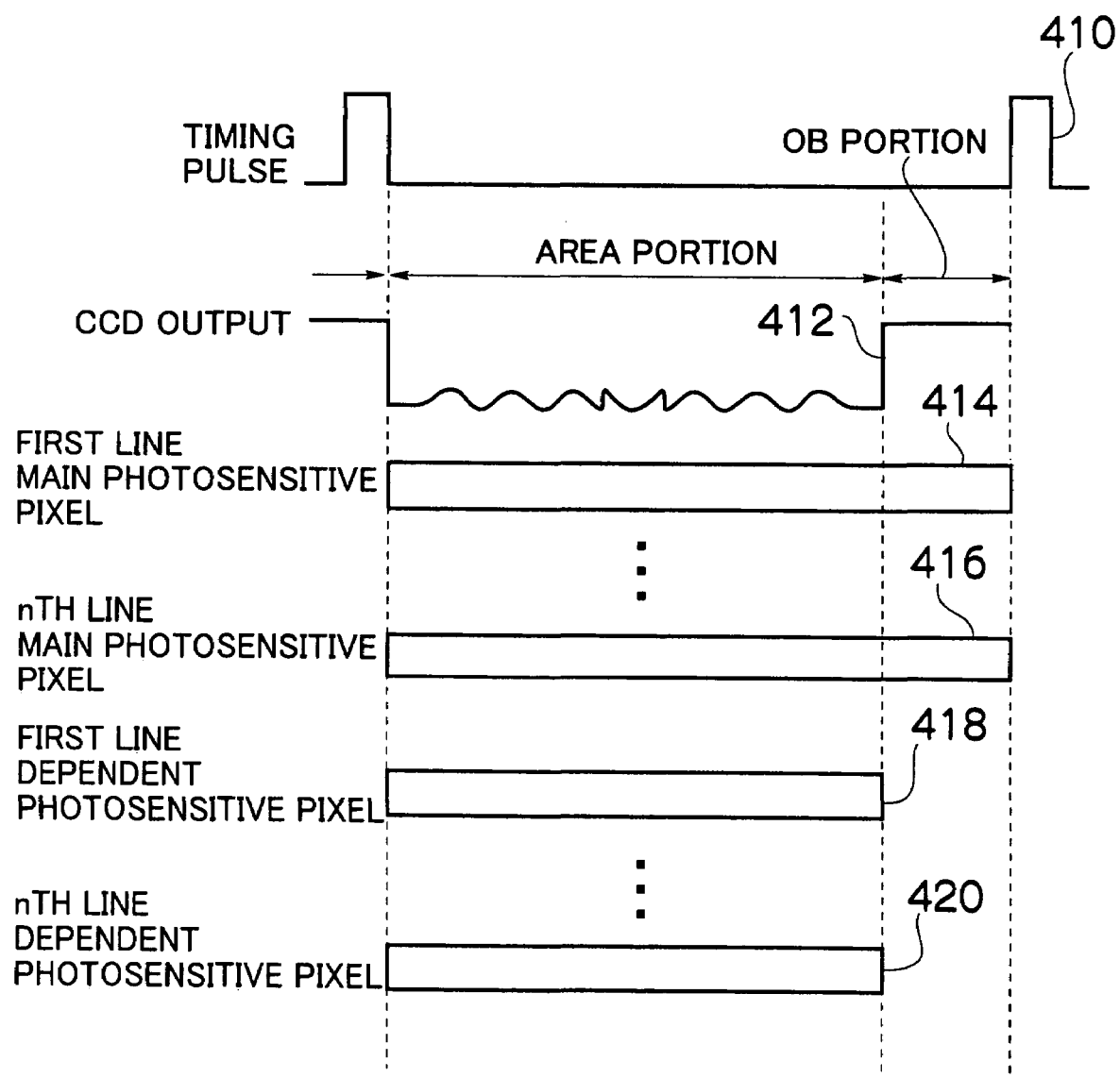
FIG. 12 is a timing chart showing signal read processing of the CCD shown in FIG. 1.

FIG. 12 is a timing chart of processing for capturing imaging signals of the CCD 12. A timing pulse 410 is an excerpt from read timing signals given from the TG 54 shown in FIG. 1 to the CCD driver 46.

In FIG. 12, an output voltage 412 represents an output voltage waveform of the CCD 12 shown in FIG. 1, and symbol 414 denotes a period over which imaging signals are captured from main photosensitive pixels of the first line shown in FIG. 9.

Similarly, symbol 416 denotes a period over which imaging signals are captured from main photosensitive pixels of the nth line, symbol 418 denotes a period over which imaging signals are captured from dependent photosensitive pixels of the first line, and symbol 420 denotes a period over which imaging signals are captured from dependent photosensitive pixels of the nth line.

In FIG. 12, periods over which imaging signals are captured from the second line to the n-1th line are omitted.

The period expressed as "area portion" represents a period over which imaging signals from pixels of the area portion are captured, and the period expressed as "OB portion" represents a period over which imaging signals from the OB portion are captured.

The CCD 12 outputs a charge signal (voltage) corresponding to the amount of incident light in synchronization with the leading edge (rise edge in FIG. 12) of the timing pulse 410, and the output voltage in the pixel of the OB portion is very low compared to the output signal in the pixel of the area portion. The leading edge of the timing pulse 410 may be a rise edge.

When the imaging signal is captured from the main photosensitive pixel, the imaging signal is captured for both the area portion and OB portion of the first line to the nth line, but when the imaging signal is captured from the dependent photosensitive pixel, the imaging signal is captured from the area portion of the first line to the nth line although it is not necessary to capture the imaging signal from the OB portion when the imaging signal is captured from the dependent photosensitive pixel because the black level correction value of the dependent photosensitive pixel is determined by multiplying the black level correction value of the main photosensitive pixel by the cell area ratio, and stored.

In the digital camera 10 configured as described above, the black level correction value of the main photosensitive pixel is multiplied by the cell area ratio between the main photosensitive pixel and the dependent photosensitive pixel as a factor to determine the black level correction value of the dependent photosensitive pixel, and therefore it is not necessary to capture the imaging signal from the dependent photosensitive pixel of the OB portion. Thus, a process burden on the CPU 16 can be reduced by an amount equivalent to processing for capturing the imaging signal from the dependent photosensitive pixel of the OB portion.

An alteration of this embodiment will now be described.

In the embodiment described above, for obtaining the imaging signal from a pixel blocked from light, the OB portion 304 shown in FIG. 9 is provided, and a black level correction value is calculated based on the imaging signal obtained from the OB portion 304.

Instead of obtaining the imaging signal from the OB portion 304, an imaging signal with the area portion 302 fully blocked from light is acquired. Because the imaging signal obtained in this way is identical to the imaging signal obtained from the OB portion 304, a black level correction value can be determined from the imaging signal with the area portion 302 fully blocked from light.

First, the imaging signal is captured from the main photosensitive pixel in the full light-blocking state, and the average value of the imaging signal is determined for each line and stored as a black level correction value in the second memory 218 shown in FIG. 8. The average value of the imaging signal may be determined not only for each line, but also for a plurality of lines, or for one screen.

At this time, a black level correction value of the dependent photosensitive pixel is determined from the black level correction value of the main photosensitive pixel and stored in the second memory 218 shown in FIG. 8 as in the case of the black correction value of the main photosensitive pixel.

Then, imaging signals can be captured from the main photosensitive pixel and the dependent photosensitive pixel in a light-exposure state to perform black level correction for both the main photosensitive pixel and dependent photosensitive pixel with the offset processing unit 202 shown in FIG. 8.

In the digital camera 10 configured as described above, a black level correction value is determined from the imaging signal with the area portion 302 fully blocked from light, and therefore it is not necessary to capture the imaging signal of the OB portion either for the main photosensitive pixel or for the dependent photosensitive pixel.

The digital camera is illustrated in this embodiment, but the application range of the present invention is not limited to the digital camera. The present invention may be applied to electronic apparatuses (imaging apparatuses) having imaging systems and digital signal processing systems such as cellular phones with cameras, PDAs and notebook computers.

What is claimed is:

1. An imaging apparatus comprising:
    a solid-state imaging element having a structure in which a large number of pixel cells each comprised of a combination of a main photosensitive pixel having a relatively large area and a dependent photosensitive pixel having a relatively small area are arranged according to a predetermined arrangement form, and a signal based on a signal charge photoelectrically converted with said main photosensitive pixel and a signal based on a signal charge photoelectrically converted with said dependent photosensitive pixel can be selectively acquired;
    an imaging signal acquirement controlling device which performs control to acquire an imaging signal from said solid-state imaging element;
    a main black level correction value determining device which determines a black level correction value of the main photosensitive pixel based on a signal obtained from said main photosensitive pixel;
    a dependent black level correction value determining device which determines a black level correction value of the dependent photosensitive pixel by calculation from the black level correction value of the main photosensitive pixel determined by said main black level correction value determining device; and
    a black level correcting device which performs black level correction of the imaging signal acquired from said main photosensitive pixel based on the black level correction value of the main photosensitive pixel determined by said main black level correction value determining device, and performs black level correction of the imaging signal acquired from said dependent photosensitive pixel based on the dependent photosensitive pixel determined by said dependent black level correction value determining device.

2. The imaging apparatus according to claim 1, wherein said solid-state imaging element comprises a photosensitive pixel portion being an effective pixel area, and a light-blocking pixel portion which is provided at a predetermined position other than said effective pixel area and in which the light-receiving surface of said pixel cell is blocked from light, and
    said main black level correction value determining device calculates a black level correction value of a main photosensitive pixel belonging to said photosensitive pixel portion based on a signal acquired from a main photosensitive pixel belonging to said light-blocking pixel portion.

3. The imaging apparatus according to claim 2, wherein said imaging signal acquirement controlling device does not perform control to acquire an imaging signal from a dependent photosensitive pixel in said light-blocking pixel portion.

4. The imaging apparatus according to claim 1, wherein the black level correction value of said dependent photosensitive pixel is calculated by multiplying the black level correction value of said main photosensitive pixel by a ratio of the cell area of said main photosensitive pixel to the cell area of said dependent photosensitive pixel.

5. The imaging apparatus according to claim 2, wherein the black level correction value of said dependent photosensitive pixel is calculated by multiplying the black level correction value of said main photosensitive pixel by a ratio of the cell area of said main photosensitive pixel to the cell area of said dependent photosensitive pixel.

6. The imaging apparatus according to claim 3, wherein the black level correction value of said dependent photosensitive pixel is calculated by multiplying the black level correction value of said main photosensitive pixel by a ratio of the cell area of said main photosensitive pixel to the cell area of said dependent photosensitive pixel.

* * * * *